United States Patent
Liu

(10) Patent No.: US 10,928,581 B2
(45) Date of Patent: Feb. 23, 2021

(54) BACKLIGHT MODULE AND DISPLAY DEVICE

(71) Applicant: WUHAN CHINA STAR OPTOELECTRONICS TECHNOLOGY CO., LTD., Hubei (CN)

(72) Inventor: Jian Liu, Hubei (CN)

(73) Assignee: Wuhan China Star Optoelectronics Technology Co., Ltd., Hubei (CN)

( * ) Notice: Subject to any disclaimer, the term of this patent is extended or adjusted under 35 U.S.C. 154(b) by 0 days.

(21) Appl. No.: 16/611,227

(22) PCT Filed: Sep. 9, 2019

(86) PCT No.: PCT/CN2019/104880
§ 371 (c)(1),
(2) Date: Nov. 6, 2019

(87) PCT Pub. No.: WO2020/252941
PCT Pub. Date: Dec. 24, 2020

(65) Prior Publication Data
US 2020/0400873 A1    Dec. 24, 2020

(30) Foreign Application Priority Data

Jun. 19, 2019 (CN) .......................... 2019 1 0531748

(51) Int. Cl.
*F21V 8/00* (2006.01)
*G02F 1/13357* (2006.01)
*G02F 1/1333* (2006.01)

(52) U.S. Cl.
CPC ........... *G02B 6/0085* (2013.01); *G02B 6/009* (2013.01); *G02B 6/0031* (2013.01);
(Continued)

(58) Field of Classification Search
CPC ................. G02F 2001/133311–133334; G02F 1/133608; G02B 6/0031; G02B 6/009; G02B 6/0085
See application file for complete search history.

(56) References Cited

U.S. PATENT DOCUMENTS

| 8,267,569 B2 * | 9/2012 | Hamada ............... G02B 6/0085 362/612 |
| 2007/0165421 A1 * | 7/2007 | Sakai ..................... G02B 6/009 362/612 |

(Continued)

FOREIGN PATENT DOCUMENTS

| CN | 201066417 Y | 5/2008 |
| CN | 104421768 A | 3/2015 |

(Continued)

*Primary Examiner* — Mariceli Santiago
(74) *Attorney, Agent, or Firm* — Mark M. Friedman

(57) ABSTRACT

The present invention discloses to a backlight module and a display device. A flexible printed circuit board is connected to a step of a plastic frame, so that the flexible printed circuit board can be prevented from being adhered to a light guide plate, and thus a distance between a light source and an iron frame can be reduced, and heat dissipation performance of the backlight module can be enhanced. A blocking wall is disposed on each of two side faces of a light-emitting unit perpendicular to the plastic frame, and a reflective film is disposed on a side surface of the blocking wall facing the light-emitting unit, so that light emitted from the light-emitting unit can be collected and reflected, and a greater amount of light can enter the light guide plate from the light-emitting unit, enhancing luminous efficiency of the backlight module, and reducing manufacturing costs.

16 Claims, 1 Drawing Sheet

(52) U.S. Cl.
CPC .. *G02F 1/133603* (2013.01); *G02F 1/133615* (2013.01); *G02F 2001/133314* (2013.01); *G02F 2001/133317* (2013.01)

(56) References Cited

U.S. PATENT DOCUMENTS

| | | | |
|---|---|---|---|
| 2008/0024694 A1* | 1/2008 | Kondo | G02B 6/009 349/58 |
| 2008/0180972 A1* | 7/2008 | Sakamoto | G02B 6/009 362/613 |
| 2014/0204607 A1 | 7/2014 | Yan | |
| 2014/0247398 A1 | 9/2014 | Kakimoto | |
| 2016/0364056 A1* | 12/2016 | Chen | G02F 1/133308 |
| 2019/0113675 A1* | 4/2019 | Sugimoto | G02F 1/133308 |

FOREIGN PATENT DOCUMENTS

| | | |
|---|---|---|
| CN | 206193412 U | 5/2017 |
| CN | 106801823 A | 6/2017 |
| TW | 201430460 A | 8/2014 |

\* cited by examiner

BACKLIGHT MODULE AND DISPLAY DEVICE

BACKGROUND OF INVENTION

1. Field of Invention

The present invention relates to a technical field of displays, and particularly to, a backlight module and a display device.

2. Related Art

With ever-changing liquid crystal display technology, application fields of liquid crystal displays, especially color liquid crystal displays, are also expanding. Thanks to development of liquid crystal displays, backlight industry has also been prosperous. Liquid crystal displays are passive light-emitting elements, and the displays do not emit light on their own, but are illuminated by backlight systems below them. The backlights and the liquid crystal displays are combined to form liquid crystal display modules. Liquid crystal backlights are flat uniform illumination devices, and cold cathode fluorescent tubes or light-emitting diode (LED) bars functioning as a light source are arranged on both sides or one side of an entire backlight source (may be a long side or a short side). Cold cathode lamps are a line light source, and LEDs are a point light source. To convert such a light source into a surface light source, light guide plates are thus required. The light guide plates are generally made of high-transmittance acrylic plastic, and their surfaces are very smooth and flat, so that the most amount of internal light can be regularly totally reflected on the flat surfaces and will not be emitted outside the light guide plates. A bottom of each of the light guide plates of liquid crystal displays is printed with white dots. In a position where the dots printed on the light guide plate, light is no longer regularly reflected but will be emitted above the light guide plate. How much light can be reflected from positions of the white dots on the light guide plates is under control of a density of the white dots. Precisely designed dots on light guide plates allow incident light from both sides of backlight sources to spread evenly across entire surfaces. Optical films are further placed above the light guide plates. These films provide uniform light and concentrate large angles of light for frontal viewing.

The so-called backlight source (backlight) is a kind of light source behind liquid crystal displays (LCDs), and its lighting effects directly affect liquid crystal display modules (LCMs) visual performance. The backlight is mainly composed of a light source, a light guide plate, an optical film, a plastic frame, and the like. The backlight has the characteristics of high brightness, a long lifespan, and uniform illumination. The backlight is divided into an edge-lit backlight and a direct-lit backlight depending on a location of the light source.

Edge lighting is a single light source placed on a side, and is configured with light guide plates fabricated by injection molding without a printing layout. The edge lighting is commonly used in small and medium-sized backlight modules of 30 inches or less. The light source design of the side incident light has characteristics of being light in weight, being compact, narrow frame, and low power consumption, and is also a light source for mobile phones, tablets, and notebook computers. There are also large-sized TV backlight modules using an edge-lighting structure.

As a screen ratio of mobile phones has been increasing, brightness of backlights is also required to increase. In order to meet the above-mentioned requirements, number of LED lights is therefore increased. Along with the increase in the number of LED lights, it means that heat generated by the LED lights during the illuminating process will become greater. If the heat is not dissipated in time, service life of backlight modules will be adversely affected. At the same time, since light emitted by LED lamps is scattered and no light collection is performed on LED light-emitting surfaces of LED lights, a part of the light does not enter light guide plates, causing an overall display brightness to be lost. Therefore, it is imperative to improve backlight modules to overcome the above-mentioned problem.

SUMMARY OF INVENTION

An object of the present invention is to provide a backlight module and a display device capable of dissipating heat generated by a light source and collecting light emitted by the light source to avoid light loss.

In order to overcome the above-mentioned problem, the present invention provides a backlight module, comprising an iron frame; a plastic frame disposed on the iron frame and comprising a step; a flexible printed circuit board connected to the step of the plastic frame; a light source disposed adjacent to an inner side of the plastic frame on the flexible printed circuit board; and a light guide plate disposed adjacent to a side of the light source away from the plastic frame on the flexible printed circuit board.

Further, the light source comprises at least a light-emitting unit, wherein a blocking wall is disposed on each of the two side faces of the light-emitting unit perpendicular to the plastic frame, and wherein a reflective film is disposed on a side surface of the blocking wall facing the light-emitting unit.

Further, the blocking wall further extends over a top face of the light-emitting unit away from the iron frame, and a reflective film is disposed on a side surface of the blocking wall facing the light-emitting unit.

Further, the blocking wall is connected to the plastic frame.

Further, the reflective film further extends to a side face of the plastic frame facing the light-emitting unit.

Further, the blocking wall is connected the plastic frame.

Further, the reflective film further extends to a side face of the plastic frame facing the light-emitting unit.

Further, an adhesive is disposed on a side of the step facing the iron frame, and the flexible printed circuit board is connected to the step of the plastic frame through the adhesive.

Further, the backlight module further comprises a reflective layer disposed between the light guide plate and the iron frame.

Further, the backlight module further comprises an optical film disposed on a side surface of the light guide plate away from the iron frame.

Further, the backlight module further comprises a light shielding tape disposed on the plastic frame.

The present invention further provides a display device, comprising a backlight module, wherein the backlight module comprises an iron frame; a plastic frame disposed on the iron frame and comprising a step; a flexible printed circuit board connected to the step of the plastic frame; a light source disposed adjacent to an inner side of the plastic frame on the flexible printed circuit board; and a light guide plate disposed adjacent to a side of the light source away from the plastic frame on the flexible printed circuit board.

Further, the light source comprises at least a light-emitting unit, wherein a blocking wall is disposed on each of two side faces of the light-emitting unit perpendicular to the plastic frame, and wherein a reflective film is disposed on a side surface of the blocking wall facing the light-emitting unit.

Further, the blocking wall further extends over a top face of the light-emitting unit away from the iron frame, and a reflective film is disposed on a side surface of the blocking wall facing the light-emitting unit.

Further, the blocking wall is connected the plastic frame.

Further, the reflective film further extends to a side face of the plastic frame facing the light-emitting unit.

Further, the blocking wall is connected the plastic frame.

Further, the reflective film further extends to a side face of the plastic frame facing the light-emitting unit.

Further, an adhesive is disposed on a side of the step facing the iron frame, and the flexible printed circuit board is connected to the step of the plastic frame through the adhesive.

Further, the display device further comprises a reflective layer disposed between the light guide plate and the iron frame.

The present invention relates to a backlight module and a display device. In one aspect, the flexible printed circuit board is connected to the step of the plastic frame, so that the flexible printed circuit board can be prevented from being adhered to the light guide plate by an adhesive, thereby to reduce a distance between the light source and the iron frame, and to enhance heat dissipation performance of the backlight module. In another aspect, the blocking wall is disposed on each of the two side faces of the light-emitting unit perpendicular to the plastic frame, and the reflective film is disposed on a side surface of the blocking wall facing the light-emitting unit, so that light emitted from the light-emitting unit can be collected and reflected and a greater amount of light can enter the light guide plate from the light-emitting unit, thereby to enhance luminous efficiency of the backlight module, and to reduce manufacturing costs.

BRIEF DESCRIPTION OF DRAWINGS

To describe the technical solutions in the embodiments of the present invention, the following briefly introduces the accompanying drawings for describing the embodiments. Apparently, the accompanying drawings in the following description show merely some embodiments of the present invention, and a person skilled in the art may still derive other drawings from these accompanying drawings without creative efforts.

DESCRIPTION OF PREFERRED EMBODIMENTS

Figure 1:
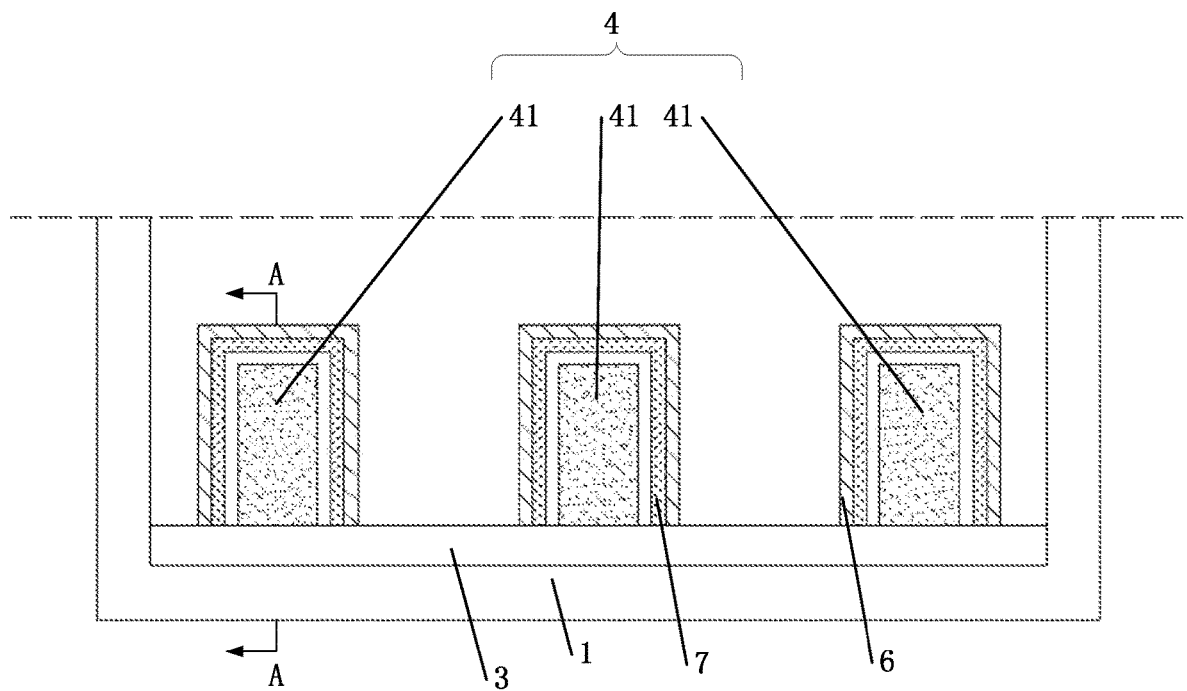
FIG. 1 is a schematic structural view of a backlight module of the present invention.

The preferred embodiments of the present invention are described in detail below with reference to the accompanying drawings, in which it will be easier for those skilled in the art to understand how to implement the invention. The present invention may, however, be embodied in many different forms and embodiments, and the scope of the invention is not limited to the embodiments described herein.

Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Like reference numerals designate like elements throughout the specification. In addition, the size and thickness of each component shown in the drawings are arbitrarily shown for understanding and ease of description, but the present invention is not limited thereto.

When a component is described as "on" another component, the component can be disposed directly on the other component; there can also be an intermediate component that is disposed on the intermediate component, and the intermediate component is disposed on another component. When a component is described as "installed to" or "connected to" another component, it can be understood as "directly" or "connected" or a component is "mounted to" or "connected" another component through an intermediate component.

Embodiment 1

Figure 2:
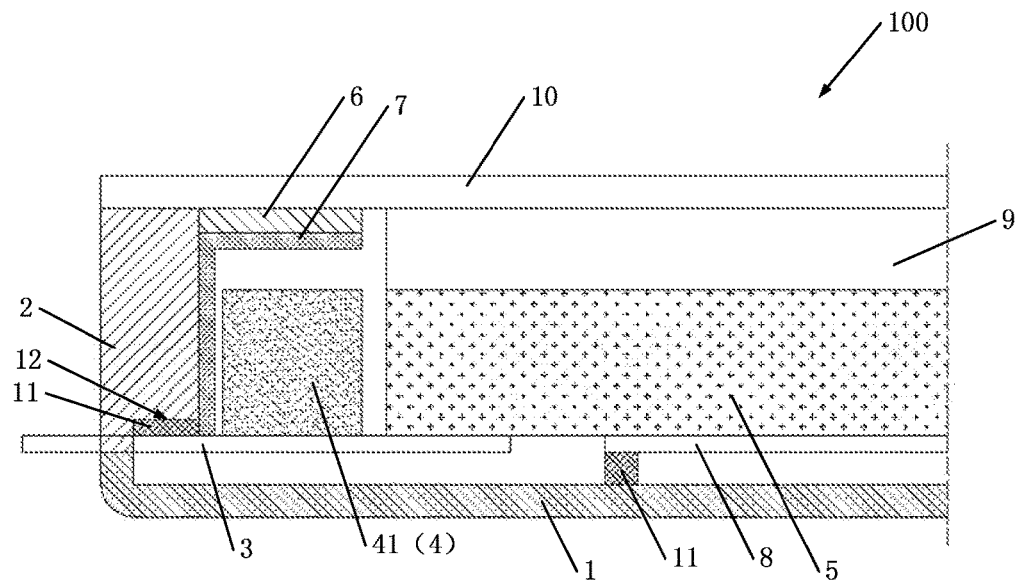
FIG. 2 is a cross-sectional view taken along line A-A of the structural view of the backlight module of the present invention.

As shown in FIG. 1 and FIG. 2, a backlight module 100 includes an iron frame 1, a plastic frame 2, a flexible printed circuit board 3, a light source 4, a light guide plate 5, a blocking wall 6, a reflective film 7, a reflective layer 8, an optical film 9, and a light shielding tape 10.

As shown in FIG. 2, the plastic frame 2 is disposed on the iron frame 1 and includes a step 12. An adhesive 11 is disposed on a side of the step 12 facing the iron frame 1. The flexible printed circuit board 3 is connected to the plastic frame 3 through the adhesive 11. Specifically, the adhesive 11 can be a double-sided tape, so that the adhesive 11 can be prevented from being adhered to the light guide plate 5, thereby reducing a distance between the light source and the iron frame 1, and thus enhancing heat dissipation performance of the backlight module 100.

As shown in FIG. 2, the light source 4 is disposed adjacent to an inner side of the plastic frame 2 on the flexible printed circuit board 3. The light source 4 includes at least a light-emitting unit 41. The light-emitting unit 41 is arranged in a direction along the plastic frame 2 on the flexible printed circuit board 3. The light-emitting unit 41 may be a light-emitting diode (LED) lamp because the LED lamp has advantages of being energy saving, environmentally friendly, a long lifespan, small volume, and the like.

The blocking wall 6 is disposed on each of the two side faces of the light-emitting unit 41 perpendicular to the plastic frame 2. The reflective film 7 is disposed on a side surface of the blocking wall 6 facing the light-emitting unit 41. The blocking wall 6 may further extends over a top face of the light-emitting unit 41 away from the iron frame 1, and a side surface of the blocking wall 6 facing the light-emitting unit 41 is provided with the reflective film 7. In this manner, light emitted from the light-emitting unit 41 can be collected by the reflective film 7 disposed on the blocking wall 6 and can be reflected into the light guide plate 5, so that an amount of light entering the light guide plate 5 from the light-emitting unit 41 is increased, and both brightness and lighting effects of the backlight module 100 are also increased, thereby reducing manufacturing costs.

As shown in FIG. 1, in this embodiment, the blocking wall 6 is disposed on each of the two side faces of the light-emitting unit 41 perpendicular to the plastic frame 2. The reflective film 7 is disposed on a side surface of the blocking wall 6 facing the light-emitting unit 41. The blocking wall 6 may further extends over a top face of the light-emitting unit 41 away from the iron frame 1, and a side surface of the blocking wall 6 facing the light-emitting unit 41 is provided with the reflective film 7. In this manner, light emitted from the light-emitting unit 41 can be collected by the reflective film 7 disposed on the blocking wall 6 and is reflected into the light guide plate 5, so that an amount of light entering the light guide plate 5 from the light-emitting unit 41 is increased, and both brightness and lighting effects of the backlight module 100 are also increased, thereby reducing manufacturing costs.

As shown in FIG. 2, the blocking wall 6 is connected to the plastic frame 2, wherein a side surface of the plastic frame 2 facing the light-emitting unit 41 is also provided with the reflective film 7 having a function the same as that of the reflective film 7 on the blocking wall 6. That is, light emitted from the light-emitting unit 41 can be collected and can be reflected into the light guide plate 5, so that an amount of light entering the light guide plate 5 from the light-emitting unit 41 is increased, and both brightness and lighting effects of the backlight module 100 are also increased, thereby reducing manufacturing costs.

As show in FIG. 2, the light guide plate 5 is disposed adjacent to a side of the light source 4 away from the plastic frame 2 on the flexible printed circuit board 3. The light guide plate 5 converts the light emitted by the light source 4 into a planar light source, so that the light enters an upper optical film 9 to bring about display effects.

As shown in FIG. 2, the reflective layer 8 is disposed between the light guide plate 5 and the iron frame 1 through the adhesive 11. Specifically, the adhesive 11 can be a double-sided tape. The reflective layer 8 is configured to reflect light reflected by the light guide plate 5, so that the light can be used to enhance luminous efficiency of the backlight module 100.

As shown in FIG. 2, the optical film 9 is disposed on a side surface of the light guide plate 5 away from the iron frame 1. The optical film 9 specifically includes a lower diffusion sheet, a prism sheet, and an upper diffusion sheet. The lower diffusion sheet is disposed on the light guide plate 5; the prism sheet is disposed on the lower diffusion sheet; the upper diffusion sheet is disposed on the prism sheet; and the light shielding sheet is disposed on the upper diffusion sheet. The lower diffusion sheet and the upper diffusion sheet have a plurality of granular objects configured to diffuse light received by the light guide plate 5, so that the light can propagate in a front direction of the display panel, thereby to widen a viewing angle, and to conceal a pattern formed on the light guide plate 5. The prism sheet can concentrate the diffused light to be emitted at a certain angle to achieve a purpose of improving brightness of the display panel.

As shown in FIG. 2, the light shielding tape 10 disposed on the plastic frame 2 is mainly configured to prevent the backlight module 100 from causing light leakage, affecting optical performance.

The present invention further provides a display device, wherein the display device includes the above-mentioned backlight module.

The backlight module and the display device provided by the present invention are described in detail above. It is understood that the exemplary embodiments described herein are to be considered as illustrative only, and are not intended to limit the invention. Descriptions of features or aspects in each exemplary embodiment should generally be considered as suitable features or aspects in other exemplary embodiments. Though the invention has been described with reference to the preferred embodiments thereof, various modifications and changes can be made by those skilled in the art. The present invention is intended to cover such modifications and variations within the scope of the appended claims, and any modifications, equivalents, and modifications within the spirit and scope of the present invention are intended to be included within the scope of the present invention.

What is claimed is:

1. A backlight module, comprising:
an iron frame;
a plastic frame disposed on the iron frame and comprising a step;
a flexible printed circuit board connected to the step of the plastic frame;
a light source disposed adjacent to an inner side of the plastic frame on the flexible printed circuit board; and
a light guide plate disposed adjacent to a side of the light source away from the plastic frame on the flexible printed circuit board;
wherein the light source comprises at least a light-emitting unit, wherein a blocking wall is disposed on each of the two side faces of the light-emitting unit perpendicular to the plastic frame and extends over a top face of the light-emitting unit away from the iron frame, and wherein a reflective film is disposed on a side surface of the blocking wall facing the light-emitting unit.

2. The backlight module of claim 1, wherein the blocking wall is connected to the plastic frame.

3. The backlight module of claim 2, wherein the reflective film further extends to a side face of the plastic frame facing the light-emitting unit.

4. The backlight module of claim 1, wherein the blocking wall is connected the plastic frame.

5. The backlight module of claim 4, wherein the reflective film further extends to a side face of the plastic frame facing the light-emitting unit.

6. The backlight module of claim 4, wherein an adhesive is disposed on a side of the step facing the iron frame, and the flexible printed circuit board is connected to the step of the plastic frame through the adhesive.

7. The backlight module of claim 1, further comprising a reflective layer disposed between the light guide plate and the iron frame.

8. The backlight module of claim 1, further comprising an optical film disposed on a side surface of the light guide plate away from the iron frame.

9. The backlight module of claim 1, further comprising a light shielding tape disposed on the plastic frame.

10. A display device, comprising a backlight module, wherein the backlight module comprises:
an iron frame;
a plastic frame disposed on the iron frame and comprising a step;
a flexible printed circuit board connected to the step of the plastic frame;
a light source disposed adjacent to an inner side of the plastic frame on the flexible printed circuit board; and
a light guide plate disposed adjacent to a side of the light source away from the plastic frame on the flexible printed circuit board;

wherein the light source comprises at least a light-emitting unit, wherein a blocking wall is disposed on each of two side faces of the light-emitting unit perpendicular to the plastic frame and extends over a top face of the light-emitting unit away from the iron frame, and wherein a reflective film is disposed on a side surface of the blocking wall facing the light-emitting unit.

11. The display device of claim 10, wherein the blocking wall is connected the plastic frame.

12. The display device of claim 11, wherein the reflective film further extends to a side face of the plastic frame facing the light-emitting unit.

13. The display device of claim 10, wherein the blocking wall is connected the plastic frame.

14. The display device of claim 13, wherein the reflective film further extends to a side face of the plastic frame facing the light-emitting unit.

15. The display device of claim 10, wherein an adhesive is disposed on a side of the step facing the iron frame, and the flexible printed circuit board is connected to the step of the plastic frame through the adhesive.

16. The display device of claim 10, further comprising a reflective layer disposed between the light guide plate and the iron frame.

* * * * *